United States Patent
Trass et al.

(10) Patent No.: US 7,323,021 B2
(45) Date of Patent: Jan. 29, 2008

(54) ASH REACTIVATION

(76) Inventors: Olev Trass, 4 Conrad Avenue, Toronto, Ontario (CA) M6G 3G5; Eduardo Gandolfi, 46 Harrington Crescent, Toronto, Ontario (CA) M2M 2Y5; Edward John Anthony, 256 2nd Avenue, Ottawa, Ontario (CA) K1S 2H9

( * ) Notice: Subject to any disclaimer, the term of this patent is extended or adjusted under 35 U.S.C. 154(b) by 564 days.

(21) Appl. No.: 10/073,063

(22) Filed: Feb. 12, 2002

(65) Prior Publication Data
US 2003/0151023 A1 Aug. 14, 2003

(51) Int. Cl.
*C10L 5/00* (2006.01)

(52) U.S. Cl. .................. 44/628; 106/705; 110/342; 110/347

(58) Field of Classification Search ........... 252/185; 44/550, 580, 628; 106/705; 110/342, 346, 110/347
See application file for complete search history.

(56) References Cited

U.S. PATENT DOCUMENTS

| 4,043,831 | A | * | 8/1977 | Friedman ............ 75/750 |
| 4,325,327 | A | | 4/1982 | Kantesaria et al. |
| 4,387,653 | A | | 6/1983 | Voss |
| 4,411,879 | A | * | 10/1983 | Ehrlich et al. ........ 423/640 |
| 5,137,753 | A | * | 8/1992 | Bland et al. ........ 427/180 |
| 6,517,631 | B1 | * | 2/2003 | Bland ............ 106/705 |
| 6,520,099 | B1 | * | 2/2003 | Furuya ........... 110/342 |

| 2003/0044337 | A1 | * | 3/2003 | Furuya ........... 423/244.08 |

FOREIGN PATENT DOCUMENTS

| DE | 3841 456 A1 | 6/1989 |
| WO | WO 01/08785 A1 | 2/2001 |
| WO | WO0132324 | * 5/2001 |

OTHER PUBLICATIONS

Article entitled Sulfation phenomena in fluidized bed combustion systems by E.J. Anthony, D.L. Granatstein published in Progess in Energy and Combustion Science 27 (2001) 215-236.
Patent Abstracts of Japan 09042614.

* cited by examiner

*Primary Examiner*—Cephia D. Toomer
(74) *Attorney, Agent, or Firm*—Bereskin & Parr

(57) ABSTRACT

Sulphur control in fluidized bed combustion systems often involves adding a source of calcium to the combustor so that the calcium may combine with the sulphur. Ash resulting from such combustion often contains a significant amount of calcium which does not combine with the sulphur compounds. This invention teaches a method of reactivating that ash by grinding the ash in a positive transport grinding mill with water. The grinder causes the ash to simultaneously undergo grinding and hydration to convert the calcium to calcium hydroxide. Advantageously drying agents are added to the ground hydrated ash after grinding to facilitate the formation of acceptably crumbly pellets thereby increasing the amount of calcium available to react with the sulphur. A particularly advantageous aspect of the invention involves the use of wet coal slurries which are otherwise waste products as the source of water to be ground with the ash. The coal content of the slurry then forms additional fuel for the combustion process. This converts a formerly waste product into a valuable, usable resource.

30 Claims, No Drawings

ASH REACTIVATION

FIELD OF THE INVENTION

This invention relates to the field of combustion of fuel in fluidized bed combustion systems. In particular, the invention relates to the reactivation of ash for use in fluidized bed combustors for the purpose of control of sulphur oxides. An aspect of the invention involves the use of fine wet coal as a fuel source for such fluidized bed combustors.

BACKGROUND OF THE INVENTION

Fluidized bed combustors, whether circulating, bubbling, pressurized or at atmospheric pressure, have the ability to capture sulphur dioxide in situ by use of a sulphur absorbent which is typically either a calcitic limestone or dolomite. Other sorbents have been considered but price and availability have favoured calcium based sorbents especially where the sorbent is not to be regenerated.

Generally fluidized bed combustors involve sulphur capture via the following overall reactions:

$$CaCO_3 = CaO + CO_2, \Delta H = 182.1 \text{ kJ/gmol}$$

$$Ca\,O + SO_2 + \tfrac{1}{2}O_2 = CaSO_4\; \Delta H = 481.4 \text{ kJ/gmol}$$

The first reaction is endothermic and the second exothermic. In pressurized systems, calcination of $CaCO_3$ does not occur. Here the basic reaction is $$Ca.CO_3 + SO_2 + \tfrac{1}{2}O_2 = CaSO_4 + CO_2$$

The reaction is exothermic.

If dolomitic stone is used, the reactions are $$CaMg(CO_3)_2 = CaCO_3 MgO + CO_2$$

$$CaCO_3 MgO + SO_2 + \tfrac{1}{2}O_2 = CaSO_4 MgO + CO_2$$

The sulphation reaction is far from quantitative: typically 30-45% CaO conversion is obtained. In fact, between two and three times as much $CaCO_3$ must be calcined as is converted to $CaSO_4$. This relatively low utilization of limestone is one of the major limitations of the technology.

Because so much more limestone must be used than is effectively converted to $CaSO_4$, the ash from such combustors contains a substantial amount of calcium that has not been reacted to calcium sulphate. It is known that it is desirable to reactivate the ash so that the calcium can be made available to be turned into calcium sulphate. To do otherwise means that the combustor must be fed with a larger amount of limestone which impairs its efficiency.

Although the desire to reactivate ash is well-known, there remains a need to develop other mechanisms for reactivating such ash. Accordingly, it is an object of this invention to provide a system for reactivating ash so that it may take place in the sulphation reaction for the purpose of reducing sulphur dioxide emissions from such combustors.

Coal, when burnt, often involves a coal washing process. Typically in the coal washing process the particles of coal are reduced in size to pieces in the order of two inches in diameter or at least ¼ of an inch and larger. Fines from such a process may be recovered by way of flotation and by drying the coal. Typically, wet fine coal has not been considered to be of economic value. It is extremely expensive to dry wet fine coal to recover the coal and the fine powder recovered in such processes is difficult to handle. Accordingly, there has been a widespread practice of simply dumping the fine wet coal in tailing ponds and the like. Although it is known that the fine coal exists in such ponds, there has not heretofore been a satisfactory economic process for recovering the coal and using that fine coal as a fuel source.

Ultimately it would be desirable to develop a process to enable fine wet coal to be utilized as a feed source.

In accordance with another aspect of this invention, fine wet coal can be utilized as a fuel source by combining the fine wet coal with ash.

SUMMARY OF THE INVENTION

In accordance with the invention, a process for reactivating ash for feeding to a combustor so that the reactivated ash may be used as a sulphur absorbing agent comprises the steps of obtaining a quantity of ash to be activated. The process also involves obtaining a quantity of water. The ash and water are ground to simultaneously grind and hydrate a quantity of ash with the quantity of water with the simultaneous grinding being carried out at atmospheric pressure and without addition of heat.

In a particularly preferred embodiment, the invention further includes the step of adding a drying agent after grinding the ash and water. More preferably, the amount of water present during the simultaneous grinding and hydration state is in excess of the stoichiometric amount required to hydrate the ash.

Preferably the process is carried out in a mill having positive transport capacity. More preferably, the water is present within the mill in an amount of at least 30% by wt of the dry ash.

In accordance with another aspect of the invention, the invention involves using wet fine coal as a feedstock to a combustor. The process involves the steps of obtaining a supply of wet fine coal having excess water therewith. The process also involves obtaining a supply of ash. The process involves simultaneously grinding a mixture of the wet fine coal and ash to hydrate the ash at atmospheric pressure and without addition of heat. More preferably, the process involves adding a drying agent after completion of the grinding of the ash and wet fine coal.

The invention will now be described in association with the following description and illustrative examples of certain embodiments of the invention.

Fluidized bed combustion provides a convenient means of burning carbonaceous fuels for energy production. When coal or petroleum coke are burned, the sulfur oxides released must be captured. This is done by adding limestone to the bed which provides both thermal stability and a means for sulfur capture. Limestone is first calcined $$Ca.CO_3 \rightarrow Ca\,O + CO_2$$

and then sulfated $$CaO + SO_2 + \tfrac{1}{2}O_2 \rightarrow CaSO_4$$

Virtually all of the limestone is calcined, but only 30-45% is sulfated. Thus, if the remaining calcium oxide can be reused, there will be an energy saving (the calcinations reaction is endothermic), less limestone will be consumed, less carbon dioxide (a greenhouse gas) produced and less ash to be disposed of. This summarizes the incentive for ash, or sorbent reactivation.

A number of technologies have been proposed for ash reactivation. These include dry grinding to open up the particle surface so as to make it more accessible, grinding with less than stoichiometric water so that a dry power is obtained as a somewhat more reactive product, and complete hydration using the CERCHAR hydrator. Hydration of CaO produces $Ca(OH)_2$ which has a higher reactivity level with $SO_2$ to produce calcium sulphate. It has been previously established that sorbent utilization is a substantially linear function of the degree of hydration, suggesting that complete hydration will produce the most reactive regenerated sorbent.

In accordance with this invention, the process involves simultaneous grinding and hydration of the ashes. The grinding is performed at atmospheric pressure and without addition of heat and with excess water to initiate hydration, involving both mechanical action and excellent contacting of the just-created surfaces with water. Hydration is a strongly exothermic reaction and once initiated, will proceed rapidly to completion. If that wet, ground, hydrated mixture is allowed to stand, it will undergo relatively slow self-cementing reactions and harden. To avoid the self-cementing reaction it is desirable to dry the ground mixture. This can be done by adding, after some appropriate time, limestone, ash or coal, all dry, to the wet mixture. The now substantially dry mixture may then be pelletized, and the greatly reduced effect of the self-cementing reactions helps to keep the pellets strong enough for subsequent ease of handling.

Because the hydrated material is relatively dry, the self cementing reaction produces a relatively open, relatively easily broken but handleable pellet. Because the pellet is relatively open, there is a sufficiently large area available so that calcium is available for sulphur reduction other than at just the outside surface. If the pellet material is not dried, the resulting product is very hard and cannot be broken easily. While this can be handled, much of the calcium content is not available for sulphur reduction purposes. Thus, the water content is dried to the point where some self cementing occurs but the resulting pellet is not a concrete-like hard product, but rather a crumbly open product.

In one embodiment of the invention, fresh limestone is added to make the pellets, and the particle surfaces and pores of the limestone absorb most of the excess water. The amount of fresh limestone used is chosen so as to give a good moisture level for pelletizing.

Typically, the bottom ashes which have a larger average particle size would be used for reactivation. In accordance with another embodiment of the invention, the material added to dry the mixture is the flyash which leaves with the flue gas. Its average particle size is much lower and it usually contains less unutilized calcium oxide than the bottom ash. Due to its high surface area, it readily absorbs the excess water and does also get slightly hydrated, thus providing some value beyond the absorption of water and, hence, justifying its handling and reuse.

In the preferred embodiment of the invention, coal, the fuel used in the FBC boiler, is also used as the water-absorbing additive. It must be fed to the boiler in any event, and when pelletised along with the reactivated ash, provides an intimate mixture of fuel and sorbent. Relatively fine coal is preferred. It is likely that improved sorbent utilization will occur thanks to the intimate proximity during combustion of the coal and regenerated ash. Petroleum coke may also be used as the additive, particularly if that is the fuel used in the boiler.

In addition to the above specified additives, a number of dry, combustible waste materials can be utilized as water-absorbing additives. These include wastes and refuse-derived fuels (RDF); indeed, combustible waste materials such as cellulosics (e.g. sawdust) can be utilized in this manner, with coal as the main FBC fuel.

An aspect of the invention is that, with the cementitious reactions taking place during and (shortly) after pelletization, handling problems are greatly reduced. The pellets require no particular size or other characteristic properties as long as they can readily be fed to the boiler. Any fines in the waste material—which might otherwise be blown out rapidly—are thereby eliminated.

In accordance with this invention the simultaneous grinding and hydration is carried out in a grinding mill which has positive transporting capability, since such a mill can handle thicker, more viscous materials and still convey the material through the mill.

When grinding substances, the viscosity of the material as it is being ground is a matter of serious concern and the mill used must be able to handle the material in whatever state it is as introduced into the mill and in whatever state it may be during any processes which occur within the mill. Thus, typically material which is very dry and which is powder-like can be handled by most mills as a dry material. Also, most mills can handle slurries. That is to say, if there is a very high proportion of liquid in the material and if that material remains in a relatively low viscosity liquid state, the material can be easily passed through the mill. However, most mills have an intermediate range, where a material is wetter than dry and yet not wet enough to be referred to as a slurry. Such material which is paste-like in its consistency is not readily susceptible to being handled in a mill. In cases such as the present case, some of the available water will be taken up in the hydration reaction, thus reducing the water in the slurry. Additionally, some of the water available will start to partake of a cementation reaction. Thus, the material, when being ground, will become more viscous and thus may be more difficult to handle in the mill. Advantageously, the process of the present application is carried out in a machine which provides positive transport. The term positive transport is used to indicate a mill in which the arrangement of mechanical parts in the mill and/or the orientation of the mill, together with its structural components results in a positive force on the material within the mill moving it towards the outlet of the mill. This helps to enable the handling of more viscous materials in the mill.

The Szego Mill™, a planetary ring-roller mill with helically grooved rollers does provide positive transport through the mill. Its particular niche is wet grinding at high solid concentrations. A 30% (by weight) of ash, water addition, roughly twice that required for stoichiometric hydration of the residual calcium oxide, allows the Szego Mill to work efficiently.

We have determined that in order for the material to be sufficiently fluid to be handled by the Szego Mill, there must be at least 20% by weight of ash of water in the material being ground. Anything with less water will be too pasty to be successfully handled by the Szego Mill. As the Szego Mill has particularly efficient positive transport, the amount of water that may be required for other types of mills will likely be higher and will depend on the specific mill used to carry out the process.

Heretofore wet fine coal from coal preparation plants has typically been considered a nuisance and a waste material, often dumped in tailings ponds, because, to use it, it must first be dried. When flotation is used to recover some of that fine material (−28 mesh), the product is either centrifuged or filtered, to give a wet cake. That cake contains, typically, 35%-40% by weight moisture. Thermal drying is exorbitantly expensive, and as coal users want neither dusty dry nor sticky wet fine coal, most of it is never recovered. Thus, fine wet coal has often been collected in tailing ponds and never used as fuel.

According to this invention, that wet, fine coal can be combined with ash to be recycled. Both are fed, in proper proportions, to the Szego Mill, so that water in the coal acts as the water of hydration for the ash. There is simultaneous grinding and hydration as the Szego Mill provides intimate contact and under roller compression, pushes the water from the coal into the ash pores as these get opened up due to the grinding action, which in turn initiates rapid hydration.

Thus, the wet fine coal slurry is used primarily as the source of water to hydrate the CaO in the ash. The coal portion of the slurry is a fuel which can be burned in the combustor. Thus, the former waste product can be effectively used in the ash regeneration process described herein, and also the coal content is a useful fuel addition.

When determining the coal/ash proportions to be used, an important factor is the level of free calcium oxide in the ash. As the coal water slurry is being used to provide the water for the hydration and grinding purposes, the amount of water coming in with the coal is an important factor. The moisture/coal proportions are some times divided in percentage terms and some times in ratio terms. Thus, a moisture level of 35% means in a sample of 100 units by weight, 35 units by weight are water and 65 units by weight are coal. This gives a ratio of 0.35 over 0.65 or 0.54. That coal of a ratio of 0.54 may be obtained in filter cake. The moisture level of wet coal may vary upwardly to 40% (for a ratio of 0.67) in a centrifuge product through the percentage of 50% (or a 1.0 ratio) for coal fines recovered from a tailings pond after slurrying and pumping, to about 60%, (that is a ratio of 1.5) for coal obtained from a flotation unit, to as much as 80%, (that is a ratio of 4) or higher for coal which is an effluent from a coal preparation plant.

As stated above, the amount of water to be added to the dry ash must be high enough to allow the desired grinding mill to handle the mix. The water present serves several purposes. Firstly the water is available to hydrate the calcium oxide. Secondly, the water is used to cool the product, namely by evaporation. The remaining water not used to hydrate the calcium oxide or not evaporated in cooling the product remains as water in the ground mixture exiting the mill. That remaining water will be available to take part in the cementation reaction and may result in unacceptably firm, hard pellets. Thus, if excess water is available, that water may well be required to be taken up by some type of drying material as discussed above.

The following analysis for use with a Szego Mill will serve to illustrate how the amount of coal and water may be calculated to meet the needs of the process and the equipment. Experimental work on the Szego Mill has established that in order to successfully grind ash, water must be present in a ratio of 0.2 or higher. In order to grind coal in the same Szego Mill, water must be present in a ratio of 0.4. If there is insufficient water present, the mixture will be too paste-like and will not be acceptably handleable in the Szego Mill. In the other mills which do not have the same transport capability of the Szego Mill, even more water would be required.

For purposes of illustrating the desired amount of coal water, assume that there is a source of coal/water slurry available which is a 50 to 50 mix by weight or is a ratio of 1. The preferred amount of that 1.0 ratio wet coal to meet the water requirements may then be calculated. A 1.0 ratio slurry may be considered to contain 100 weight units of coal. There will also be 100 units by weight of water. As the Szego Mill requires 40 units by weight of water for 100 weight units of coal to operate acceptably, the amount of water that can be used for other purposes is 100 less 40 weight units. The amount of water that is required to successfully handle ash in the Szego mill is 20%. Thus, the amount of water in the dry coal that must be available is given by the formula;

$$\text{dry coal} \times (100-40) = \text{ash} \times 20.$$

This resolves to;

$$\frac{\text{dry coal}}{\text{ash}} = \frac{20}{60} \text{ or } \frac{1}{3}$$

This in turn means $$\frac{\text{wet coal}}{\text{ash}} = \frac{2}{3}$$

This would represent a minimum amount of water to render the mixture acceptably handleable within the Szego Mill, i.e. for every 3 weight units of ash, the process should involve at least 2 weight units of ratio 1.0 wet fine coal.

In what may be a less borderline case, that is, an easier operating range, it may be desirable to have 50% more water than the minimum discussed immediately above. Given this desired situation, the amount of dry coal to ash would then be $$\frac{30}{60} = \frac{1}{2}$$

This means that wet coal to ash ratio would be 1.0, still assuming the coal slurry used has a ratio of 1.0. This in turn means that equal amounts by weight of wet coal having a ratio of 1.0 to the same weight of dry ash would be mixed and fed to the mill.

In the case suggested immediately above, it may be reasonable to assume that the ash contains 30% of free calcium oxide, the other 70% being inert. The hydration equation for calcium oxide is

$$CaO + H_2O = Ca(OH)_2 + 65.3 \text{ kJ/mol}$$

Thus, based on the molecular weights of water and calcium oxide, this would require an amount of water equal to 10% of the ash weight. The heat of hydration is enough to evaporate 1.6 times as much water. Assuming then that a little less than ⅔ of the water is evaporated to absorb the heat, the remainder lost by sensible heat transfer, then water in an amount of about 20% of the weight of the dry ash is used and lost in either the hydration reaction or to evaporation. The water remaining will then be 19% of the dry weight or approximately 16% moisture. This number would be a reasonably good number to achieve acceptable pelletization as described above. Such pellets would be both acceptable for handling purposes and produce a reasonably open pellet where the calcium is available to take place to capture sulphur. However, it may be that a few percent of dry matter would conveniently be added at the tail end of this agglomeration pelletization step so as to prevent the pellets from sticking to each other. If more wet ash is used, more dry material must be added. Thus, to decide on the relative amounts of wet fine coal to mix with the ash, it is desirable to know the calcium oxide level in the ash as well as to take account of the moisture amount in the wet coal to be used.

The above analysis is given by way of example only to show that there is analysis to decide how much of the wet fine coal may be desirably used. However, the major benefit here is that a substance which is otherwise a waste material, namely a coal water slurry containing fine wet coal, may now be used productively with the water content serving to meet the water needs of the ash regeneration process, while the remaining coal provides an acceptable fuel source for feeding to the combustor.

In this process, the cementing ability of the hydrated ash allows good, strong pellets to be formed. The resulting product is a pelletized coal feed containing its own sulfur capture sorbent, rather than a waste product to be disposed of in a coal mine tailings pond.

In this aspect of the invention, the ash regenerated serves as a water-absorbing binder for making wet coal tailings into a quality fuel.

To summarize, the following advantages of the process include the following:

Good utilization of calcium in the limestone, hence, reduced limestone requirement.

Reduction of carbon dioxide emissions as less fresh limestone is required.

Reduced amount of ash to be finally disposed of.

A beneficial means to dispose of combustible wastes (e.g. cellulosics).

Cheaper fuel can be used as fine coal is acceptable, in pelletized form.

Both beneficial waste disposal and getting the low cost coal-based fuel when wet fine coal is used.

The invention and its advantages are also illustrated in the following examples.

EXAMPLE SET 1

As a Bench Mark This Example Set Involves Dry Grinding

CFBC bottom ash was used in the grinding examples with the Szego Mill model SM-220. Four passes through the mill were made using the mill at a rotational speed of 1000 rpm and an ash flow rate of 1050 kg/h. The product was collected in a drum and a vacuum cleaner was used to suppress the dust level. Power consumption was measured and product particle size analyzed.

The first pass in this study represents an effective flow rate of 1000 kg/h, the second is approximately equivalent to a 500 kg/h feed rate, and the fourth, 250 kg/h. The median particle size was reduced from ~500 μm to 120 μm after the second pass. Significant agglomeration was observed with the finer particles, especially after the third and fourth passes.

Reactivity of the products was tested by adding equal amounts of water to the feed, and to the products, and observing the temperature rise as the hydration of calcium oxide proceeded.

The unground feed reached the temperature peak after 150 to 160 minutes (and hydration continued for some time thereafter); the first pass product after 25-30 minutes and the 2nd pass product after 15-20 minutes; only a minimal further rate increase was observed with the other products. This shows the increased rate of hydration which can be achieved by grinding the ash. In this example there was no simultaneous grinding and hydration, the hydration occurred after the material left the mill.

EXAMPLE SET II

Wet Grinding

For wet grinding examples, water was added at the mill inlet to the CFBC ash, at a rate corresponding to 10, 20 and 30% of the weight of dry ash (250 kg/h). These, and other percentages used later are, thus, ratios, here 0.1, 0.2 and 0.3 water-to-ash.

At 10% water, all dusting was suppressed, mill operation was satisfactory and an essentially dry hot product emerged. It was partially hydrated as some water had evaporated during the operation.

At 20% water, a good, nearly dry and substantially hydrated product (90%+) was obtained. However, mill operation was unstable and not sustainable beyond a few minutes, with a very high and increasing power consumption. The cause for this was gradual plugging of the roller grooves due to the formation of a cementitious product.

At 30% water, complete hydration was attained and a wet product emerged from the mill. The operation ran smoothly, with a stable and relatively low power consumption. After about half-an-hour, the product had completely solidified, however, due to the cementation reactions. Thus, it could not be readily handled and used.

Extensive analyses of the samples were carried out. These confirmed only partial hydration of the 10% water product; but complete hydration in the 30% water product. However, in contrast to the others samples, much of the calcium in the sample was in the form of ettringite which itself can be expected to be highly reactive as a sulfur sorbent. Sulfation tests, by thermo gravimetric analysis (TGA) followed expectations, with the wet-ground samples showing higher conversions, at 90% or higher.

EXAMPLE SET III

A series of wet grinding tests were carried out, with the SM-320 mill, at a rotational speed of 400 rpm. and feed rates varying from 500 to 3000 kg/h of dry ash. Water additions were varied from 8 to 20% of dry weight. All tests exhibited some instabilities and/or gradually increasing power consumptions. Only the 3000 kg/h (i.e. coarsest particles), 20% water test showed reasonably acceptable stability but would not be suitable for long-term operation. Operation at <8% water, i.e.~5% works well, suppresses the dust, but allows only a modest level of hydration. At the other end of the scale, more than 20% water was needed; however, hydration was complete but then the product set as a hard, concrete-like material.

To show the effect of addition of coal or limestone to the ground hydrated mixture after grinding as a means of eliminating the complete setting of the resultant material, further examples were performed using the 20% water product, with manual coal additions to give 10, 16, 33 and 50% of coal based of the weight of dry ash. After two hours it was apparent that samples with 50 and 33% had excellent handling properties (granular texture), the 16% coal had large chunks of hardened ash and the 10% sample differed little from the unmixed ash—both were fully hardened. Thus, adding coal as a drying agent results in the water being taken up by the coal and the cementation amount is reduced so as to give good open pellets as described above.

EXAMPLE SET IV

Ashes from the Nova Scotia Power Corporation Point Aconi CFBC plant were ground in the SM-320 Szego Mill at a rotational speed of 600 rpm and an ash feed rate of 500 kg/h both dry and wet.

Grinding results matched the previous examples, with good dry grinding results, good 5% water results, acceptable 8% water results, and, again, unstable operation at 10-14% water so that only a few minutes of operation was possible; at 17% water the mill was inoperable.

Combustion tests were carried out in a small, 0.1 m diameter, 5.5 m high bench-scale CFBC facility. Devco Prince coal from Nova Scotia with a sulfur content of 3% was used in these tests. The results are given in Table I.

TABLE I

Sulfur capture and sorbent utilization as a function of water addition

|  | Dry ground ash | Wet-ground ash | | |
| --- | --- | --- | --- | --- |
|  |  | 5% water | 8% water | 14% water |
| Ca/S ratio | 2.8 | 2.4 | 2.4 | 2.7 |
| Sulfur capture[1] % | 25 | 41 | 65 | 68 |
| Ca utilization % | 8.9 | 17.0 | 27.3 | 25.4 |

[1]calculated on the basis that only 78% of the total coal sulfur content is liberated as $SO_2$ Table 1 gives the sulfur capture test with the ground ash alone, and with the simultaneous grinding and hydration. At comparable Ca/S ratios both sulfur capture and calcium utilization increase when grinding occurs simultaneously with hydration.

EXAMPLE SET V

The coal/ash mixture (Example III) were analysed and combustion tests were carried out in a bench-scale CFBC facility. Following coal combustion without sorbent, short duration runs were made with the 33% and 50% coal/ash mixtures respectively. The Ca/S molar ratios were very high, 7.8 and 9.5, respectively. The results indicated a sulfur capture of 20% with no added sorbent (capture by coal ashes alone or carryover of unreacted sulfur in the char or flyash), 94% and 97% with the 33% and 50% coal/ash mixture respectively.

EXAMPLE SET VI

Using ashes from the Wade Utility Plant (WUP) of Purdue University, Lafayette, Ind., a series of wet grinding examples were carried out with the SM-320 Szego Mill operating at a rotational speed of 400 rpm. The ash feed rate was 3000 kg/h.

The amount of water used varied from a high of 1500 to 1300 and finally to 850 kg/h. A tumbling concrete mixer was used subsequently to mix coal into the wet ash product.

All operations were stable. The 850 kg/h water rate, i.e. 28% of dry ash weight, gave a thick, pasty slurry. Power consumption was nearly twice as high (10.6 kW) as at the higher water flow rates, when the slurry was relatively dilute.

Various amounts of coal were used, from 15 to 60% of dry ash weight. The 15-30% coal products hardened though they were soft enough to be broken readily. At 60% coal, good agglomerated products were obtained, with agglomerate sizes ranging from 2 to 30 mm. Adding a small amount (about 2%) of dry, fine powder, coal or limestone, at the final stage of mixing helped to dry the product particle surfaces.

EXAMPLE VII

Tests were performed at the Wade Utility Plant (WUP).

Preparation of the recycled ash was carried out in two parts. During the first, dry coal was used to absorb the excess water from the ground/hydrated recycle ash. The SM-320 mill used was operated at 400 rpm and water addition was adjusted based on the appearance of ground ash paste quality at the mill outlet. The ash feed rate was approximately 3t/h. As the coal used to dry the wet ash was coarse, more than 60% had to be added, in a ratio of (1:1), to make up half the product. A tumbler was used to mix ash and coal and worked well.

During the second preparation phase, the amount of water used varied from 180-250 L per ton of ash, mainly depending on ash humidity. Additional ash was used to absorb the excess water. Tumbler mixing did not pose any problems and a pelletized product with good handling properties was obtained in all runs. The amount of dry ash added in the tumbler was in a ratio of 1:2, dry ash: wet ash.

The product, a total of 58 tonnes was mixed 7:1, coal: product and fed into a coal feed hopper. No material handling problems were encountered during the feeding of the material into the hopper or into the boiler. There was enough material for a 60 hour run.

At WUP, coal with a 4% sulfur content is burned in the boiler and limestone is added to remove the sulphur. Emissions of $SO_2$ are monitored using a continuous emission monitoring system. Enough limestone is added to achieve 92% sulfur capture with the monitoring system providing the control set point. A measure of the benefit of adding rehydrated ash is, then, a reduction of fresh limestone required per unit of steam produced.

The daily averages for the example period showed a reduction of limestone usage of approx. 18% compared to the period following the trial. This corresponds to limestone savings of about ½t/h, or 30 tonnes total over the 60 hour test period. As the total amount of ash hydrated was 36 tonnes (dry basis), calcium utilization was around 70% as compared with normal operation of about 39%.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A process for reactivating calcium containing ash and feeding said reactivated ash to a combustor so that said reactivated ash may be used as a sulphur absorbing agent, said process comprising:
   i) obtaining a quantity of ash to be activated;
   ii) obtaining a quantity of water;
   iii) grinding said ash and water to simultaneously grind and hydrate said quantity of ash with said quantity of water, said simultaneous grinding being carried out at atmospheric pressure and without addition of heat,
      wherein said process additionally includes adding a drying agent after completion of said simultaneous grinding and hydrating, and wherein said water is present in an excess amount greater than the stoichoimetric amount required to hydrate said ash, and iv) feeding said reactivated ash to a combustor.

2. The process of claim 1 wherein said drying agent is selected from the group consisting of ash, limestone, coal and cellulose containing fuels.

3. The process of claim 1 wherein said water is present in an amount of at least 20% by weight of said ash.

4. The process of claim 3 wherein said simultaneous grinding is carried out in a mill having positive transport capacity.

5. The process of claim 4 wherein said process further comprises the step of mixing said simultaneously ground hydrated ash and water and said added drying agent in a mixer.

6. The process of claim 5 further including the step of pelletizing said ground hydrated ash and drying agent.

7. The process of claim 5 wherein said drying agent is present in an amount to absorb water from said mixture such that said mixed product produces an agglomerate so that the calcium present in said agglomerate is suitable for use in the sulphation reaction at the surface area of such agglomerate and internally of said agglomerate.

8. The process of claim 7 wherein said agglomerate comprises a mixture of said ground hydrated ash and a combustible drying agent.

9. The process of claim 8 wherein said agglomerate of said simultaneously ground and hydrated ash and drying agent forms an agglomerate which is crumbly.

10. The process of claim 1 wherein said water is present in an amount of at least 30% by weight of the ash.

11. The process of claim 10 wherein simultaneous grinding is carried out in a mill which does not have positive transport capacity.

12. The process of claim 11 wherein said process further comprises the step of mixing said simultaneously ground hydrated ash and water and said added drying agent in a mixer.

13. The process of claim 12 further including the step of pelletizing said ground hydrated ash and drying agent.

14. The process of claim 12 wherein said drying agent is present in an amount to absorb water from said mixture such that said mixed product produces an agglomerate so that the calcium present in said agglomerate is suitable for use in the sulphation reaction at the surface area of such agglomerate and internally of said agglomerate.

15. The process of claim 14 wherein said agglomerate comprises a mixture of said ground hydrated ash and a combustible drying agent.

16. The process of claim 15 wherein said agglomerate of said simultaneously ground and hydrated ash and drying agent forms an agglomerate which is crumbly.

17. A process of mixing wet fine coal with ash to form a feedstock to be fed to a combustor comprising:

obtaining a supply of wet fine coal having excess water therewith, obtaining a supply of calcium containing ash, simultaneously grinding a mixture comprising said wet fine coal and said ash to hydrate said ash at atmospheric pressure and without addition of heat and using said ground mixture as a feedstock to a combustor and wherein said process additionally includes adding a drying agent after completion of said simultaneous grinding and hydrating.

18. The process of claim 17 wherein said drying agent is selected from the group consisting of combustible materials.

19. The process of claim 17 wherein said drying agent is selected from the group consisting of ash, limestone, coal and cellulose containing fuels.

20. The process of claim 17 wherein water is present in said mixture of ash and coal in an excess amount greater than the stoichoimetric amount required to hydrate said ash.

21. The process of claim 20 wherein said water is present in an amount of at least 20% by weight of said ash on a dry basis.

22. The process of claim 20 wherein said simultaneous grinding is carried out in a mill having positive transport capacity.

23. The process of claim 17 wherein said water is present in an amount of at least 30% by weight of the ash on a dry basis.

24. The process of claim 17 wherein water is present in an amount of at least 33 1/3% by weight of ash on a dry basis.

25. The process of claim 17 wherein water is present in an amount of at least 50% by weight of ash on a dry basis.

26. The process of claim 17 wherein said mixture of water, coal, ash and drying agent is pelletized after said grinding.

27. The process of claim 17 wherein said mixture of water, coal, ash and drying agent is pelletized after adding said drying agent.

28. A process for reactivating calcium containing ash and feeding said reactivated ash to a combustor so that said reactivated ash may be used as a sulphur absorbing agent, said process comprising:

obtaining a quantity of ash to be activated, obtaining a supply of wet fine coal having excess water therewith, grinding said ash and said wet fine coal to simultaneously grind and hydrate said quantity of ash with said quantity of wet fine coal, said simultaneous grinding being carried out at atmospheric pressure and without additional heat, and wherein said ground ash and wet fine coal is fed to a combustor.

29. The process of claim 28 wherein said process additionally includes adding a drying agent after completion of said simultaneous grinding and hydrating.

30. A process for reactivating ash for feeding to a combustor so that said reactivated ash may be used as a sulphur absorbing agent, said process comprising:

i) obtaining a quantity of ash to be activated;

ii) obtaining a quantity of water;

iii) grinding said ash and water to simultaneously grind and hydrate said quantity of ash with said quantity of water, said simultaneous grinding being carried out at atmospheric pressure and without addition of heat, wherein said process additionally includes adding a drying agent after completion of said simultaneous grinding and hydrating, and wherein said water is present in an excess amount greater than the stoichoimetric amount required to hydrate said ash.

* * * * *